DRIVE MECHANISM FOR SOUND RECORDING AND PLAYBACK DEVICES

Filed Sept. 17, 1964

Inventor:

United States Patent Office 3,319,478 Patented May 16, 1967

3,319,478

DRIVE MECHANISM FOR SOUND RECORDING AND PLAYBACK DEVICES

Heinz Gruber, Kronach, Oberfranken, Germany, assignor to Loewe Opta G.m.b.H., Berlin, Germany, a company of Germany Filed Sept. 17, 1964, Ser. No. 397,339
1 Claim. (Cl. 74—202)

Figure 1:
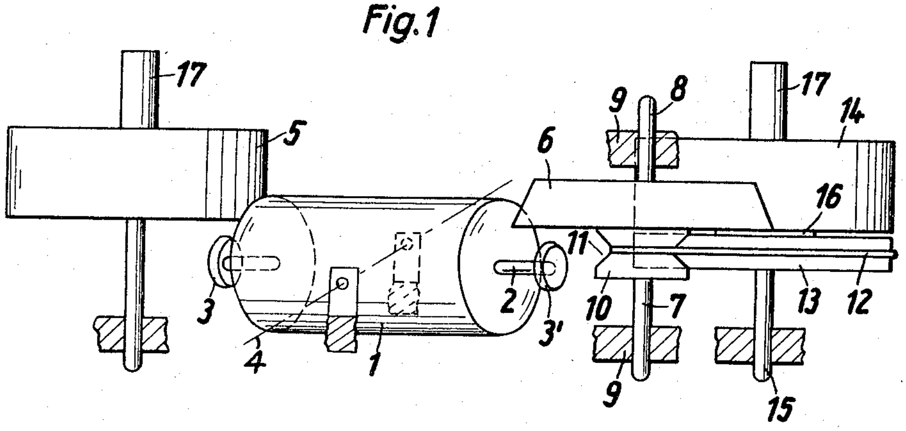

This invention relates to tape recorders and more particularly to recorders in which the capstan, the flywheel and the left-hand and right-hand spindles are driven by a single motor. Such recorders require one or several adjustably supported intermediate gears, e.g., friction wheels, or engageable and disengageable belt drives or a combination of the said gearing elements.

For sound-tape machines of simple design, such as battery-powered dictating machines, which dispense with good synchronous qualities and enhanced comfort of operation and have no flywheel mass and no rapid forward and reverse tape drive, the gearing elements can be highly simplified where according to a known form of design the turntables are driven by a motor having a continuous shaft with two friction wheels and being tiltable around a middle axis transversely to the motor shaft. In this drive one friction wheel can in each case be engaged with an adjacent turntable.

The disadvantage of magnetic-tape machines of this type consists, as already indicated, in the fact that good synchronous running adequate for musical recording and the rapid tape drive for rewinding or spotting a certain point on the sound tape, are dispensed with.

The invention is based on the problem of creating a drive mechanism for sound recording and playback devices which mechanism with a minimum of technical expenditure leads to a solution fulfilling the present-day demands for recording and/or playback quality and comfort in operation of such deliberately simply designed machines.

According to the invention a drive mechanism for tape recorders comprises in combination a base plate, a first and a second spindle, a turntable fastened on each of said spindles, a third spindle provided with a flywheel, a clutch disc, a friction layer fastened on said clutch disc, an endless belt, a drive motor and two friction wheels attached to the ends of the shaft of said motor; said spindles being rotatably mounted on the base plate, said clutch disc being pivotally mounted on said second spindle, the turntable of said second spindle being coupled with said clutch disc by said friction layer, said belt being adapted to couple said flywheel with said clutch disc, said motor together with said friction wheels being tiltably arranged around a gravity axis which lies transversally to the motor shaft, said friction wheels being adapted to be coupled either with said first turntable or with said second turntable or not to be coupled with one of said turntables.

Figure 2:
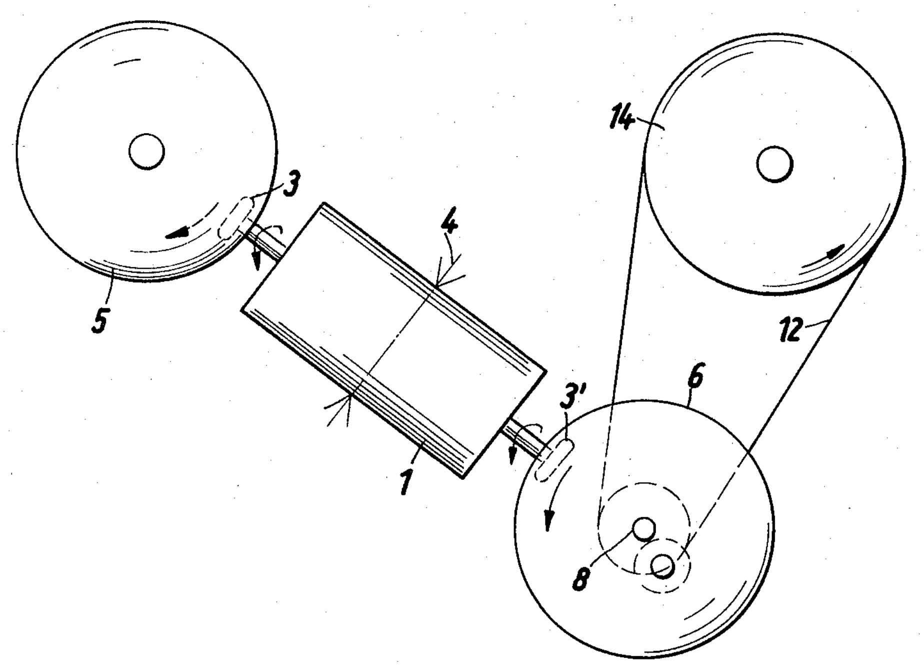

The invention is explained with the help of an embodiment represented in the accompanying drawing:

In the drawing:

FIG. 1 indicates a drive mechanism according to the invention in side view;

FIG. 2 indicates a plan view of the drive mechanism in accordance with FIG. 1.

In FIG 1, 1 indicates a drive motor, e.g. a D.C. motor, with continuous shaft 2, which bears on each end one friction wheel 3, 3'. The motor can be tilted around its centre of gravity axis 4, (FIG. 2) which lies transversely to the motor shaft, the motor being disposed on the bearing parts 9 in the interspace, between a left-hand turntable 5 and a flywheel mass 6.

By tilting the motor out of its normal position, in which the friction wheels are retracted from the turntable and from the flywheel mass (stopped position), friction wheel 3 can e.g. be made to engage with the underside of the turntable 5 or friction wheel 3' with the underside of flywheel mass 6. The flywheel mass, whose shaft 7 is at one end 8 formed as a capstan, is led into the bearing parts 9, which in the drawing are merely schematically indicated. A projection or lug 10 of the flywheel mass has an annular groove 11, over which a belt 12 is laid which encloses a clutch disk 13 of the right-hand turntable 14. Clutch disk 13 is supported freely rotatable on spindle 15 and is slippably coupled over a friction layer 16 with the underside of turntable 14, which is fixidly disposed on spindle 15. Turntables 5 and 14 are in the conventional manner supported unilaterally and each has a projecting journal 17 to take the tape spools.

With the drive mechanism according to the invention the following operations can be realised in a simple manner:

(1) Stopped position: the friction wheels are retracted from the left-hand turntable and from the flywheel mass (FIG. 1), (2) Normal running: the motor is tilted so that friction wheel 3' engages with the flywheel mass; turntable 14 rotates anti-clockwise (cf. direction of continuous arrow in FIG 2), (3) Rapid reverse running; the motor runs in the same direction as in normal running and is tilted so that friction wheel 3 engages with turntable 5; turntable rotates clockwise (cf. dotted arrow).

The motor can be tilted mechanically or electromagnetically.

The new drive mechanism is especially suitable for battery-powered sound recording and playback devices and combines the advantage of particular simplicity with good synchronous running properties and enhanced operating comfort through rapid running for rewinding the tape.

What I claim is:

Drive mechanism for tape recorders comprising in combination a base plate, a first and a second spindle, a turntable fastened on each of said spindles, a third spindle provided with a flywheel, a clutch disc, a friction layer fastened on the clutch disc, an endless belt, a drive motor, and two friction wheels attached to the ends of the shaft of said motor; said spindles being rotatably mounted on the base plate, said clutch disc being pivotally mounted on said second spindle, the turntable of said second spindle being coupled with said clutch disc by said friction layer, said belt coupling said flywheel with said clutch disc, said motor together with said friction wheels being tiltably arranged around a gravity axis which lies transversally to the motor shaft, said friction wheels being adapted to be coupled either with said first turntable or with said second turntable or not to be coupled with one of said turntables.

References Cited by the Examiner

UNITED STATES PATENTS

| | | | |
|---|---|---|---|
| 1,476,708 | 12/1923 | Gilbert | 74—207 |
| 2,027,844 | 1/1936 | Skolfield | 74—202 |

DONLEY J. STOCKING, *Primary Examiner.*
DAVID J. WILLIAMOWSKY, *Examiner.*
H. GERIN, *Assistant Examiner.*